US006957825B2

(12) United States Patent
Peters

(10) Patent No.: US 6,957,825 B2
(45) Date of Patent: *Oct. 25, 2005

(54) TRAILER IMPACT SUPPRESSION APPARATUS

(75) Inventor: Wledon J. Peters, Nanton (CA)

(73) Assignee: Rubber Ride Hitches Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/772,353

(22) Filed: Feb. 6, 2004

(65) Prior Publication Data

US 2004/0227326 A1 Nov. 18, 2004

Related U.S. Application Data

(63) Continuation-in-part of application No. 09/983,273, filed on Oct. 23, 2001, now Pat. No. 6,698,785.
(60) Provisional application No. 60/246,614, filed on Nov. 8, 2000.

(51) Int. Cl.$^7$ .............................................. B60D 1/00
(52) U.S. Cl. ...................................................... 280/483
(58) Field of Search .............................. 280/483, 484, 280/485, 489, 495, 439, 440

(56) References Cited

U.S. PATENT DOCUMENTS

| | | | | | |
|---|---|---|---|---|---|
| 2,878,036 | A | * | 3/1959 | Simmons | 280/485 |
| 3,199,903 | A | * | 8/1965 | Wood | 403/224 |
| 3,796,444 | A | * | 3/1974 | Hixon | 280/483 |
| 3,863,956 | A | * | 2/1975 | Khan | 280/483 |
| 3,868,098 | A | * | 2/1975 | Coombs | 267/138 |
| 3,904,226 | A | * | 9/1975 | Smalley | 280/486 |
| 4,326,730 | A | * | 4/1982 | Tomen | 280/502 |
| 4,792,154 | A | * | 12/1988 | Kerst et al. | 280/489 |
| 4,901,896 | A | * | 2/1990 | Speer | 224/520 |
| 4,991,864 | A | * | 2/1991 | Potsch | 280/441 |
| 5,380,030 | A | * | 1/1995 | Gullickson | 280/486 |
| 5,423,565 | A | * | 6/1995 | Smith | 280/411.1 |
| 5,823,560 | A | * | 10/1998 | Van Vleet | 280/484 |
| 5,868,415 | A | * | 2/1999 | Van Vleet | 280/483 |
| 6,220,618 | B1 | * | 4/2001 | Smith et al. | 280/447 |
| 6,474,674 | B2 | * | 11/2002 | Piercey, III | 280/441 |
| 6,494,478 | B1 | * | 12/2002 | MacKarvich | 280/489 |
| 6,581,953 | B2 | * | 6/2003 | Jerry | 280/486 |
| 6,601,867 | B2 | * | 8/2003 | Carty | 280/483 |

* cited by examiner

Primary Examiner—Lesley D. Morris
Assistant Examiner—Paul Royal, Jr.
(74) Attorney, Agent, or Firm—Andrew C. Aitken; Venable LLP

(57) ABSTRACT

A hitch receiving assembly for connecting a trailer to towing vehicle is disclosed. The hitch receiving assembly includes a first fixed elongate member mountable to a trailer and a second floating hitch receiving member that is separated from the fixed member by a plurality of elongate resilient members.

9 Claims, 10 Drawing Sheets

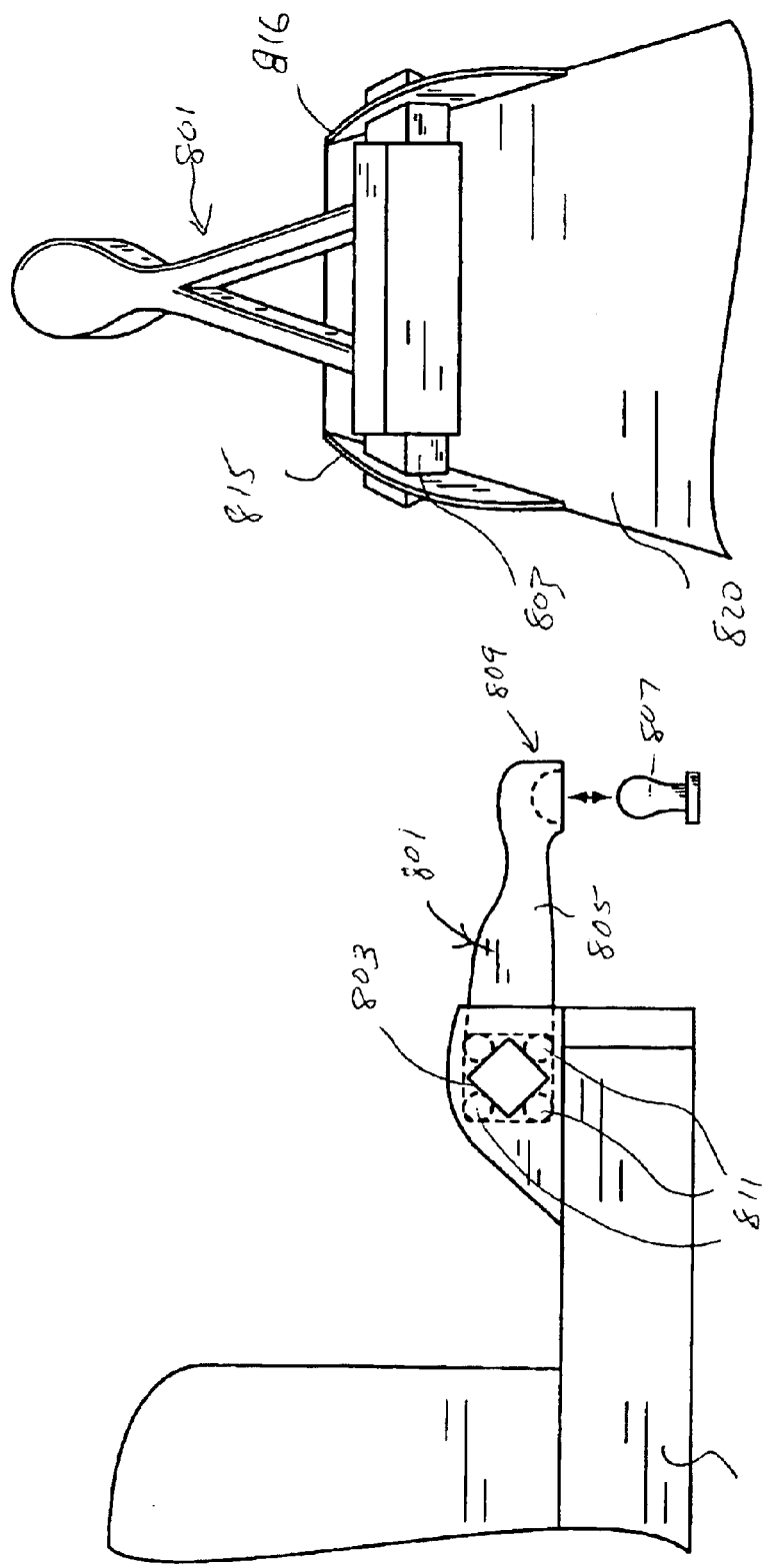

TRAILER IMPACT SUPPRESSION APPARATUS

The present invention relates to the field of hitches, and more particularly, to hitches for connecting trailers to automobiles and trucks. The applicant claims the benefit of U.S. Application No. 60/246,614, filed Nov. 8, 2000 and continuation in part of U.S. application Ser. No. 09/983,273 filed on Oct. 23, 2001, now U.S. Pat. No. 6,698,785.

BACKGROUND OF THE INVENTION

Coupling systems for connecting trailers or sleds to motor vehicles encounter significant shock and vibrational forces under normal towing conditions. These coupling systems, commonly known as hitches, typically include a rigid body attached to the vehicle linked to another rigid body that is attached to the trailer. As the trailer and vehicle move with respect to one another, the rigid bodies are subject to forces in a number of directions.

A first conventional type of hitch, referred to as a ball hitch, employs a semi-spherical or ball-shaped extension that is supported by a vertically oriented pin. The pin is typically connected either to a rigid tow plate or draw-bar that is in turn, attached to the vehicle. The ball is engineered to engage an opposite coupling, usually mounted on an extension referred to as a tongue, that fits over the top of the ball-shaped extension or otherwise engages the ball. In most conventional circumstances, the ball hitch is attached to the vehicle and the coupler is located on the trailer. This arrangement creates a fairly rigid towing system but allows the trailer to pivot in a horizontal plane with respect to the vehicle and allows limited pivoting movement in a vertical direction. This type of system, like most other hitch engagements, transmits considerable shock and vibration between the trailer and the towing vehicle. As referred to above, the ball hitch may be attached to vehicles using a draw bar tube which allow for easy removal of the ball hitch. A draw bar tube is an elongate member that is received within an opposite draw bar receiving tube. The draw bar receiving tube is typically affixed to the vehicle in a permanent manner or semi-permanent manner using fasteners or by welding.

Another commonly used linking arrangement involves a vertically oriented pin that is provided on the trailer which is received in a collar located on the vehicle. This engagement, commonly referred to as a king-pin engagement, is typically used for towing heavy loads and requires the towing vehicle to bear a significant portion of the trailer weight. In a king-pin arrangement, the pin can pivot within the collar and has some freedom to move within the collar in a vertical direction.

As discussed above, conventional ball hitches are frequently attached to vehicles using a draw bar arrangement. In this type of arrangement, a first hollow receiver tube is mounted to the underside or bumper of the towing vehicle that receives a second draw bar tube. A pair of opposite corresponding holes may be formed on opposite sides of both the receiver tube and draw bar. A connector pin is inserted through the holes to connect the receiver tube and draw bar and thereby prevent rectilinear movement. In some arrangements a trailer hitch assembly or L-shaped tow plate having a conventional form of hitch ball is secured to the draw bar. The connecting pin assembly of the draw bar arrangement allows for a releasable interconnection between the receiver tube of the towing vehicle and the draw bar of the towed trailer.

In each of the examples, constant shock and vibrational forces in various directions will be transmitted from the trailer to the hitch and consequently to the towing vehicle causing wear to the vehicle and hitch, and an uncomfortable ride. The shock and vibrational forces acting on the hitch have numerous sources. For example, upon acceleration or deceleration of the towing vehicle, momentum and inertial forces due to the loads contained on the trailer are longitudinally transmitted from the trailer to the towing vehicle. Uneven and rough surfaces upon which the vehicles are traveling are also a source of both longitudinal and vertical forces acting on the hitch and trailer. It is well known that undue wear and damage to the towing vehicle, the hitch, and the trailer result from the continuous shock and vibration commonly associated with towing a trailer. Vibration and wear are cumulative problems in regard to loosening fasteners and abrasively eroding joints parts and in general on both the vehicle and trailer. In addition to the respective wear on the vehicles, the existence of significant forces being transferred to the vehicle from the trailer makes driving the towing vehicle unpleasant because it adversely effects the ride of the vehicle.

To overcome the problems associated with shock and vibration, trailer hitches with many different dampening mechanisms have been developed and proposed within the related art. Most of the previously proposed hitches with dampening mechanisms have addressed vibration and shock adsorption in either the vertical or longitudinal directions. For example, one such system that address longitudinal shock and vibration is disclosed in U.S. Pat. No. 4,817,978 to James (the '978 patent). The system disclosed in the '978 patent employs a resilient rubber or plastic block assembly within the draw bar tube to dampen fore and aft longitudinal shock and vibration. The '978 patent dampens vibrations at the connector pin connecting the draw bar and receiving tube. U.S. Pat. No. 3,961,813 to Thomas also addresses longitudinal shock but proposes to dampen shock through an assembly at the coupling member itself. The patent to Lovell, U.S. Pat. No. 4,351,542 addresses vertical shock and vibration by the use of coiled springs located in the coupling between the hitch frame and the coupler. Another system disclosed in U.S. Pat. No. 4,773,668 by Muonro, provides for dampening on a vertical axis by means of a resilient bushing inserted into the draw bar of a trailer hitch. A system that has addressed vibration and shock in both the vertical and horizontal directions is disclosed in the Van Vleet Patent, U.S. Pat. No. 5,823,560. The system disclosed by Van Vleet proposes an arrangement of bullet shaped cushions within the draw bar to dampen shock.

Despite the numerous approaches in the related art, there nevertheless remains a need for improved and alternative manners to connect vehicles to trailers that reduce noise and wear of the connecting members.

SUMMARY OF THE INVENTION

The present invention involves providing a dampening mechanism and hitch connector assemblies for connecting hitches for towing trailers. The invention involves providing a pair of concentric elongate members that have a resilient member or series of members interposed between one another. One of the elongate members has an engagement location for the hitch or a member on which a hitch is mounted, that is positioned transverse to the orientation of travel of the vehicle and trailer. Shock and vibration imposed from the trailer are transmitted through the hitch and dampened by the resilient member or members. The invention can be employed with a variety of hitches including king-pin type arrangements, ball hitches and ball hitches that are mounted on conventional draw bars. In an alternative embodiment of the invention, the dampening device is mounted on the trailer.

BRIEF DESCRIPTION OF THE DRAWINGS

FIG. 11 is a side view in elevation of an alternative embodiment of the invention shown with a ball hitch.

FIG. 12 is a rear view in elevation of the embodiment of the invention as depicted in FIG. 11.

DETAILED DESCRIPTION OF THE INVENTION

Figure 1:
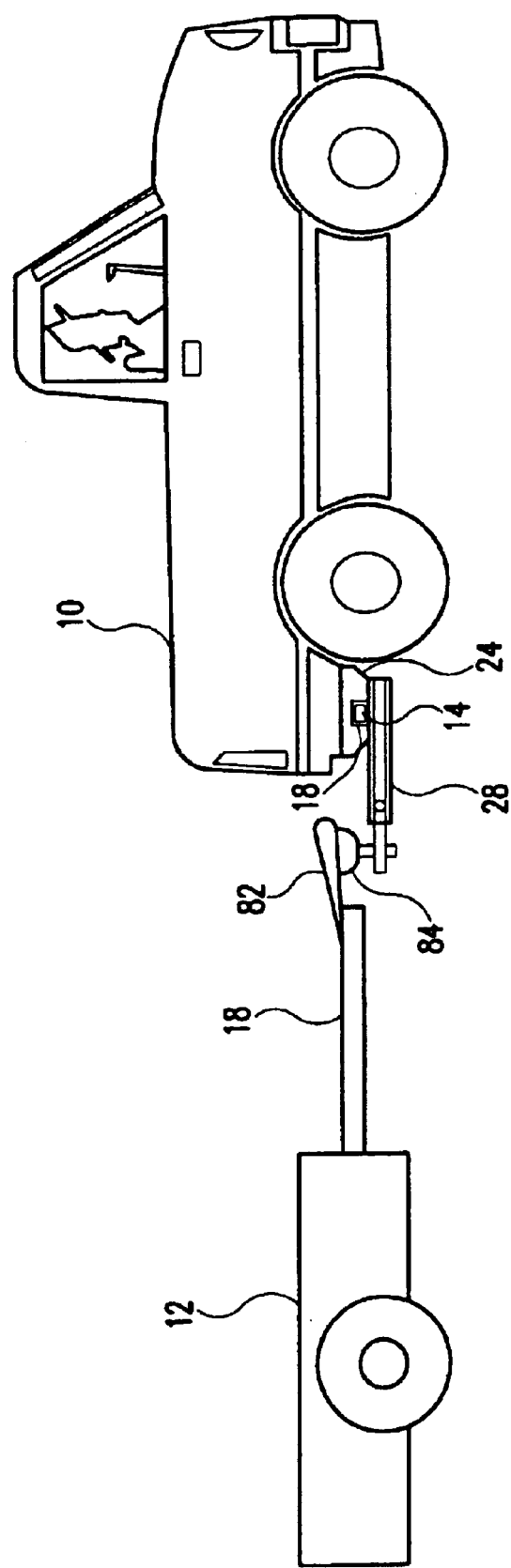
FIG. 1 depicts a first embodiment of the invention using a ball hitch to connect a vehicle and a trailer in elevation.

Now referring to FIG. 1, a vehicle 10 is depicted in engagement with trailer 12 using a hitch assembly according to the invention. Trailer 12 includes yoke or tongue 18 on which is mounted a coupler 82 adapted to engage a conventional ball hitch 84. The ball hitch is mounted on draw bar 30 that is received in draw bar receiving tube 28. Draw bar receiving tube 28 is affixed to the floating member 18 of the transverse dampening assembly that also includes fixed transverse core member 14 and a plurality of elongate resilient members. The transverse damping assembly is attached to vehicle 10 by bracket 18.

Figure 2:
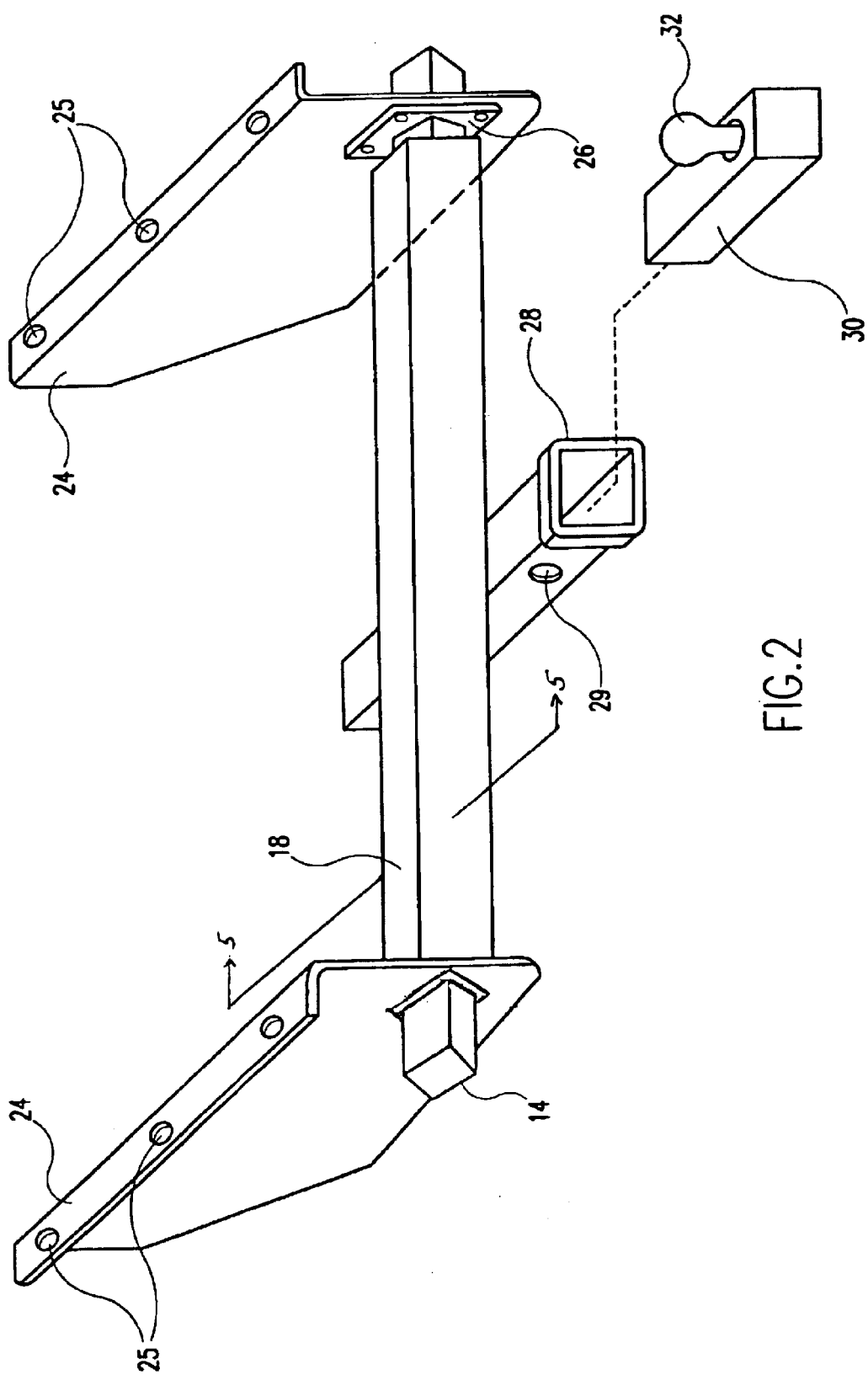
FIG. 2 is a perspective view of a first embodiment of a hitch connector assembly in accordance with the present invention.
Figure 5:
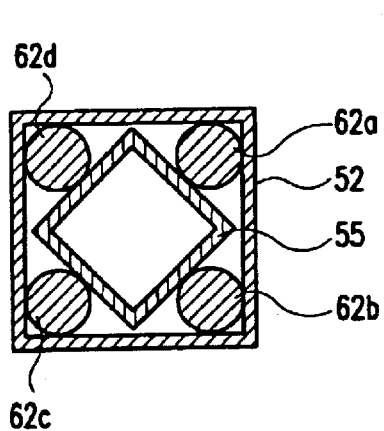
FIG. 5 is a cross sectional taken along line 5—5 in FIG. 2 of the transverse elongate member and floating member according to the invention.

Now referring to FIG. 2, on one end of draw bar 30 is a removable ball hitch 32 that may be engaged by an opposite coupling on a trailer. The draw bar has a through hole 33 for receiving a retention pin that fasteners the draw bar to the draw bar tube. Draw bar 30 is received by draw bar receiving tube 28 that has an internal dimension to closely conform with the exterior dimension of the draw bar. Although a straight tubular draw bar is depicted in FIG. 2, other draw bar arrangements such as solid bars and draw bars that include angled portions and thus allow the ball hitch to be presented at a lower elevation with respect to the elevation of the draw bar receiving tube can also be used in accordance with the present invention. Draw bar receiving tube 28 is fastened to floating transverse member 18 so that the members are fixed with respect to each other. The connection between draw bar receiving member 28 and transverse floating member 18 can be made by welding or by other methods such as the use of nuts and bolts. Floating member 18 rests on four resilient elongate members such as member 20 that connected the floating member 18 to fixed transverse core member 14. In a preferred embodiment these resilient members are made of solid vulcanized rubber however, other compressible resilient materials such as polyurethane may be employed. The resilient members are in compression between the floating transverse member and server to dampen shock from the trailer along the length of the transverse members. FIG. 5 depicts a cross sectional view taken along line 5—5 shown in FIG. 2. Although the resilient member 62b is shown merely in contact with the sidewall 55 of exterior floating member 18, in the preferred device, resilient member 62b is in compression between interior sidewall 55 and the interior wall 52 of fixed transverse core member 14. Constructed in this manner, the exterior floating member 18 is suspended on the resilient members in a manner that allows the exterior floating member to move with respect to the inner member in response to forces acting on the draw bar.

Now referring back to FIG. 2, one end of fixed transverse core member 14 is attached to bracket 24 while the opposite end is attached to bracket 24 using collar 26. The opposite brackets are attached to the vehicle by welding or the use of fasteners. This arrangement results in a fairly rigid assembly of the opposite brackets, collar and transverse interior member while the floating member and draw bar tube are separated from the rigid attachment by the resilient members. The assembly also allows for limited movement of the floating member in the horizontal and vertical direction and provides for rotational movement of the floating member 18 with respect to the fixed transverse core member 14. The floating member itself may flex along its length without transmitting these forces directly to the rigid assembly. The elongate resilient members further serve to dampen the shock and vibration from the floating torsion member along the entire length.

Fixed transverse core member 14 has a smaller cross-sectional diameter than the outer floating torsion member 18 so that fixed transverse core member 14 can be inserted and run throughout the hollow length of the floating torsion member 18. The mounting brackets such as 24a and 24b are then affixed to a towing vehicle to secure the trailer hitch assembly to the towing vehicle. In an exemplary embodiment, the fixed transverse core member 14 and torsion member 18 can be constructed of steel or any other heavy gauge metal which provides an appropriate strength for the towing application. One or a series of resilient rods or blocks 62 are inserted within the resulting spaces between the fixed transverse core member 14 and torsion member 18. In the preferred embodiment resilient rods 62a–d are to be made of vulcanized rubber, however other resilient materials such as polyurethane could be employed. Receiving tube 28 for is secured perpendicularly to the floating torsion member 18 to receive a draw bar 30. The resilient rods or blocks 20 allows for limited pivotal motion by the torsion bar 18 in relationship to the fixed transverse core member 14 and bias the forces acting on the torsion bar 18 to properly stabilize the trailer. The arrangement of the flexible torsion member combined with the resilient members also allows for the limited pivoting of the draw bar receiver tube on a horizontal plane which thereby serves to dampen movement of the trailer. Although a series of elongate rods are depicted in the preferred embodiment, it is further contemplated that other arrangements of additional resilient members may be employed such as a series of resilient blocks that extend both along the length and around the circumference of the floating member or a resilient outer sleeve that completely surrounds the central core member.

Figure 3:
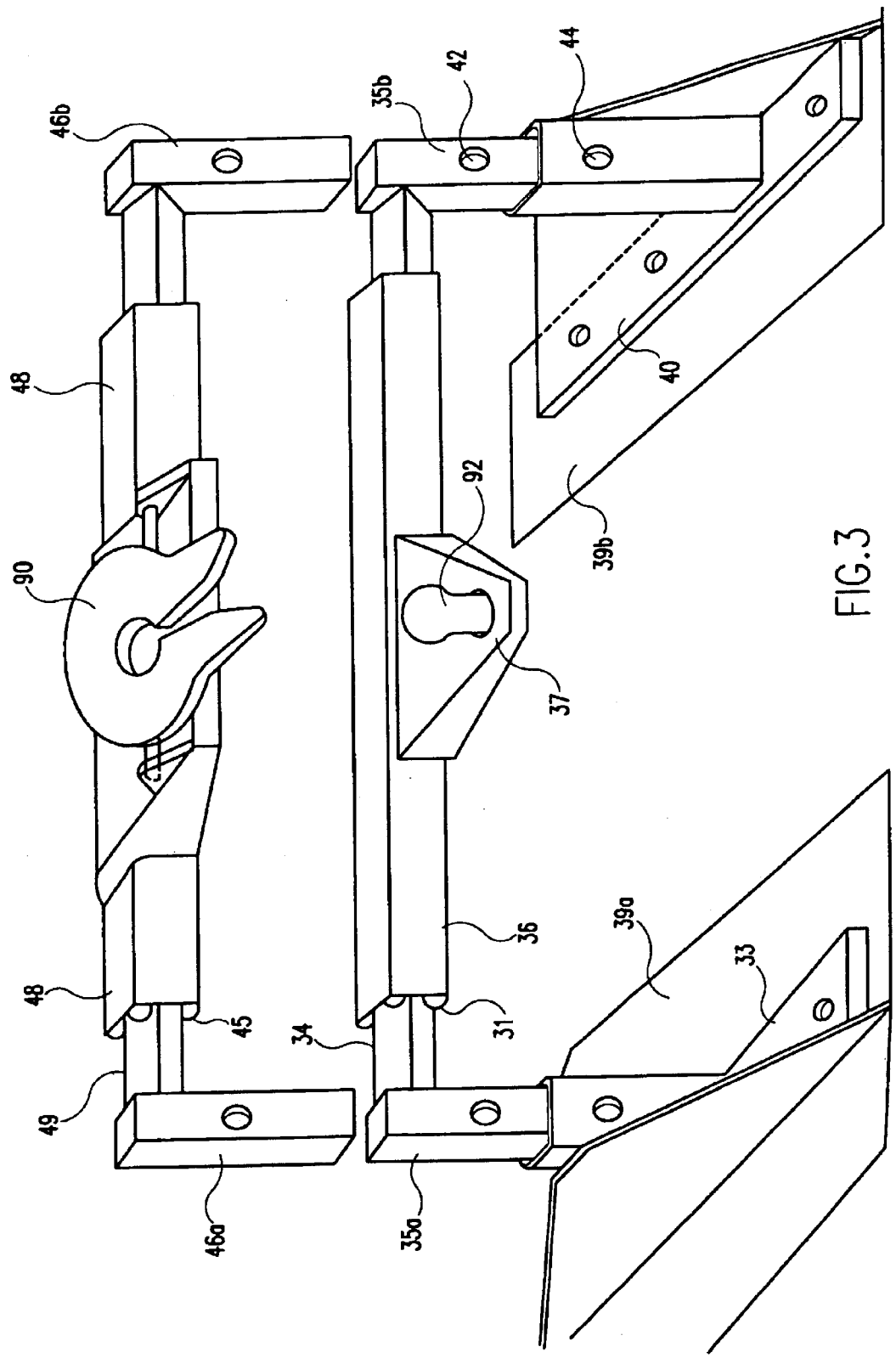
FIG. 3 is a perspective view of two alternative embodiments of the hitch connector assembly in accordance with the present invention.

FIG. 3 depicts an alternative embodiment of the invention that is designed to be mounted within a bed of a conventional pick-up truck. In this embodiment opposite piers 33 and 40 are provided that are fasten to the vehicle parts. 39a and 39b. Piers 40 and 33 have tubular portions that receive upright members. In one embodiment upright members 35a and 35b support transverse fixed member 34 that receives floating member 36. The floating member 36 is attached to the fixed member using a plurality of resilient members in the same manner that is described above. Floating member 36 is attached to a hitch receiving member 37 that is adapted to receive a conventional ball hitch 92 that may be engaged to a coupler from a trailer. Also shown in FIG. 3 is an alternative king-pin collar hitch 90 that is mounted on floating member 48. Like the ball hitch assembly, fixed transverse member 49 is attached to floating member 48 and is supported by opposite upright members 46a and 46b. These upright members 46a and 46b are received in the tubular section of piers 33 and 40.

The embodiment of the invention depicted in FIG. 3 provides for additional versatility because the hitch can be easily switched from a ball hitch to a king-pin hitch and the elevation of the hitch connection can be altered by raising or lowering the upright member within the piers. The upright members may be retained within the pier by the insertion of a pin or bolt (not shown) though hole 44 and 42 that are aligned to form a through-hole from one side of the tubular section of the pier to an opposite side. This connector pin assembly allows for a releasable interconnection between the trailer hitch and the vehicle. As shown, multiple holes in the mounting tubes allow for variations in the desired height of the hitch assembly.

Referring back to FIG. 5, in the preferred embodiment of the present invention, the floating torsion member 18 and fixed transverse core member 14 both have square cross-sections. The fixed transverse core member 14 is inserted within the floating torsion member 18 such that the fixed transverse core member 14 is oriented at a 45° angle relative to the floating torsion member 18. As a result of the orientation, at least four spaces run throughout the floating torsion member 18 at the interior corners of the torsion member housing. In this embodiment, the resilient rods 62a–d are inserted within the spaces formed between fixed transverse core member 14 and floating torsion member 18. The resilient rods 62a–d allow for a limited movement of the floating torsion member 18 and are effective to dampen the shock and vibration in both the vertical and longitudinal direction.

Figure 6:
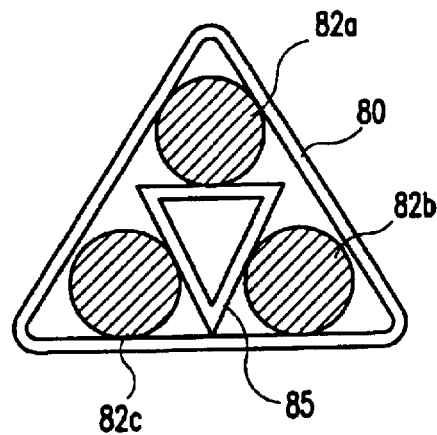
FIG. 6 is a cross section of an alternative embodiment of a transverse elongate member and floating member according to the invention.

FIG. 6 depicts an alternative embodiment of the arrangement of the floating member and core member. In this embodiment the floating torsion member and central core member both have triangular cross-sections. The central core member may be inserted into the torsion member such that the central core member has an upside down orientation relative to the torsion member. In this embodiment, the resilient rods can be inserted within the spaces formed between the central core member and torsion member.

Figure 4:
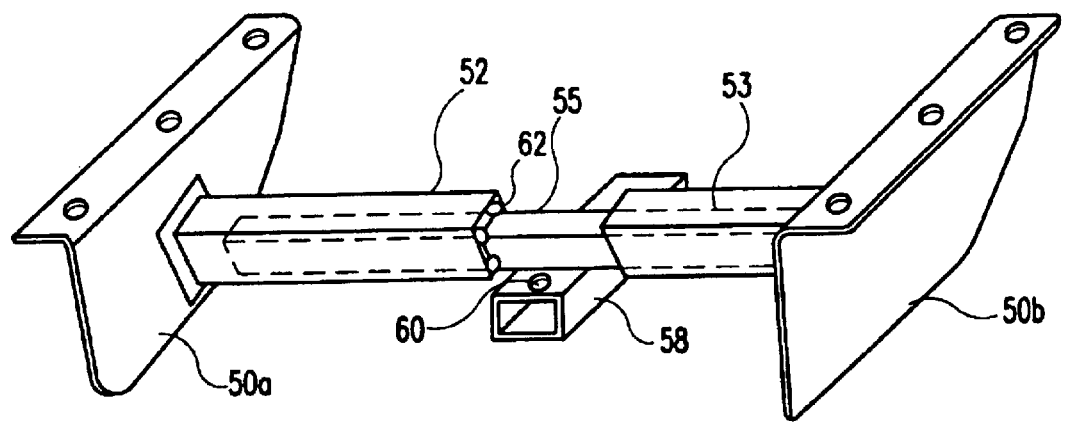
FIG. 4 is a perspective view of a further alternative embodiment of the hitch connector assembly in accordance with the present invention.

A further embodiment of the invention is depicted in FIG. 4. In this embodiment a floating torsion member 55 is attached to a draw bar receiving tube 58 and is inside opposite fixed tubular receiving members 52 and 53. The draw bar receiving tube 58 is adapted to receive a draw bar that includes a conventional ball hitch. Like the embodiments described above, the torsion member 55 is separated from the opposite fixed transverse tubular members 52 and 53 by a series of elongate resilient members that are oriented with respect to each other in parallel. The receiving members 52 is shown attached to mounting bracket 50a by flange 56 however other manners of attachment such as welding is also contemplated. The arrangement depicted in FIG. 4 allows for further flexibility than the embodiment illustrated in FIG. 2 because the transverse receiving members 52 and 53 can independently flex with respect to the floating core member 55. A further advantage of the embodiment illustrated in FIG. 4 is that it allows the opposite brackets 50a and 50b to be mounted at different distances with respect to one another and therefore the assembly is easily adaptable to different vehicles.

Figure 7:
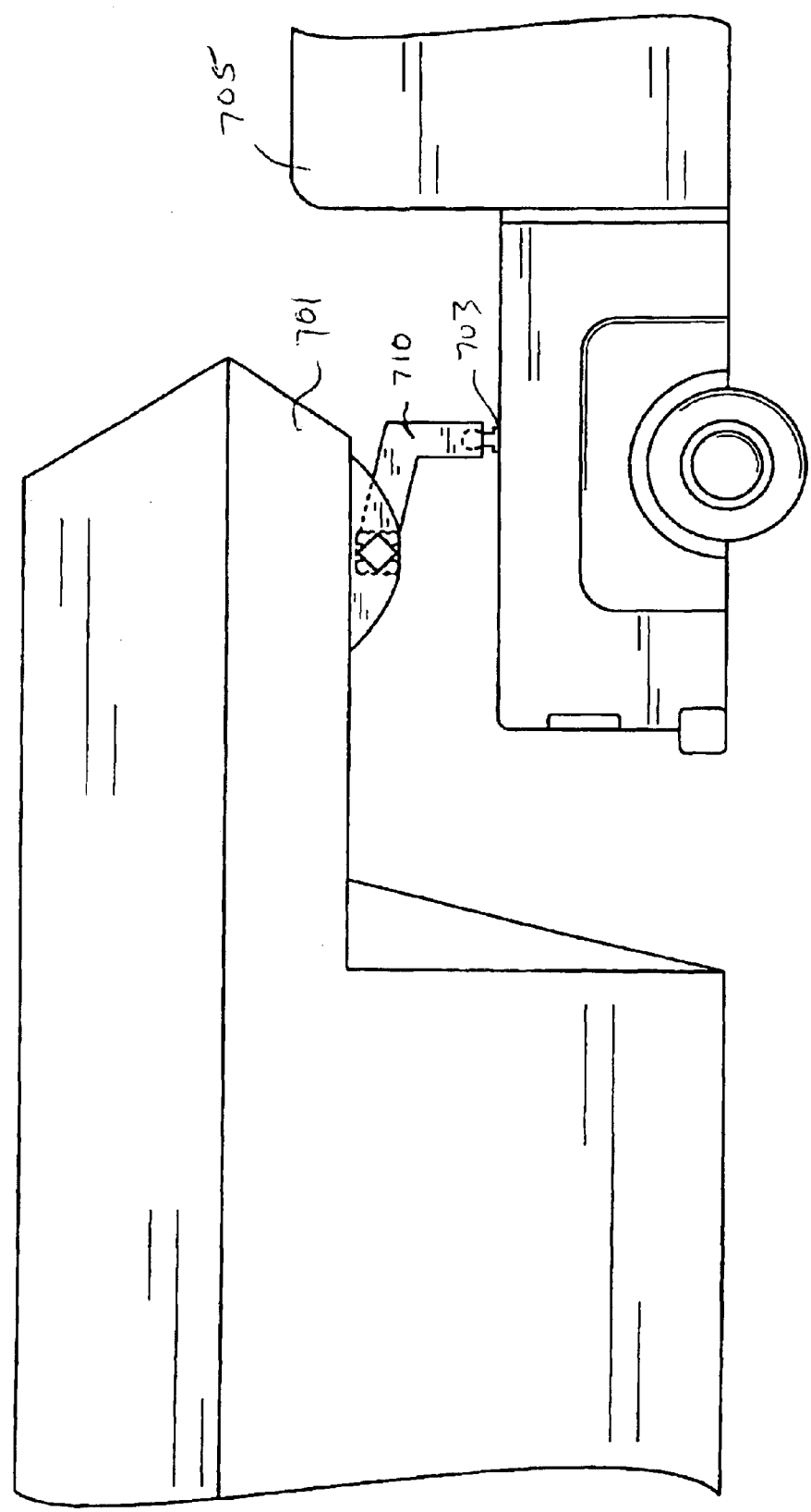
FIG. 7 is a side view in elevation of an alternative embodiment of the invention intended to be affixed to a trailer shown in a towing engagement with a vehicle.
Figure 8:
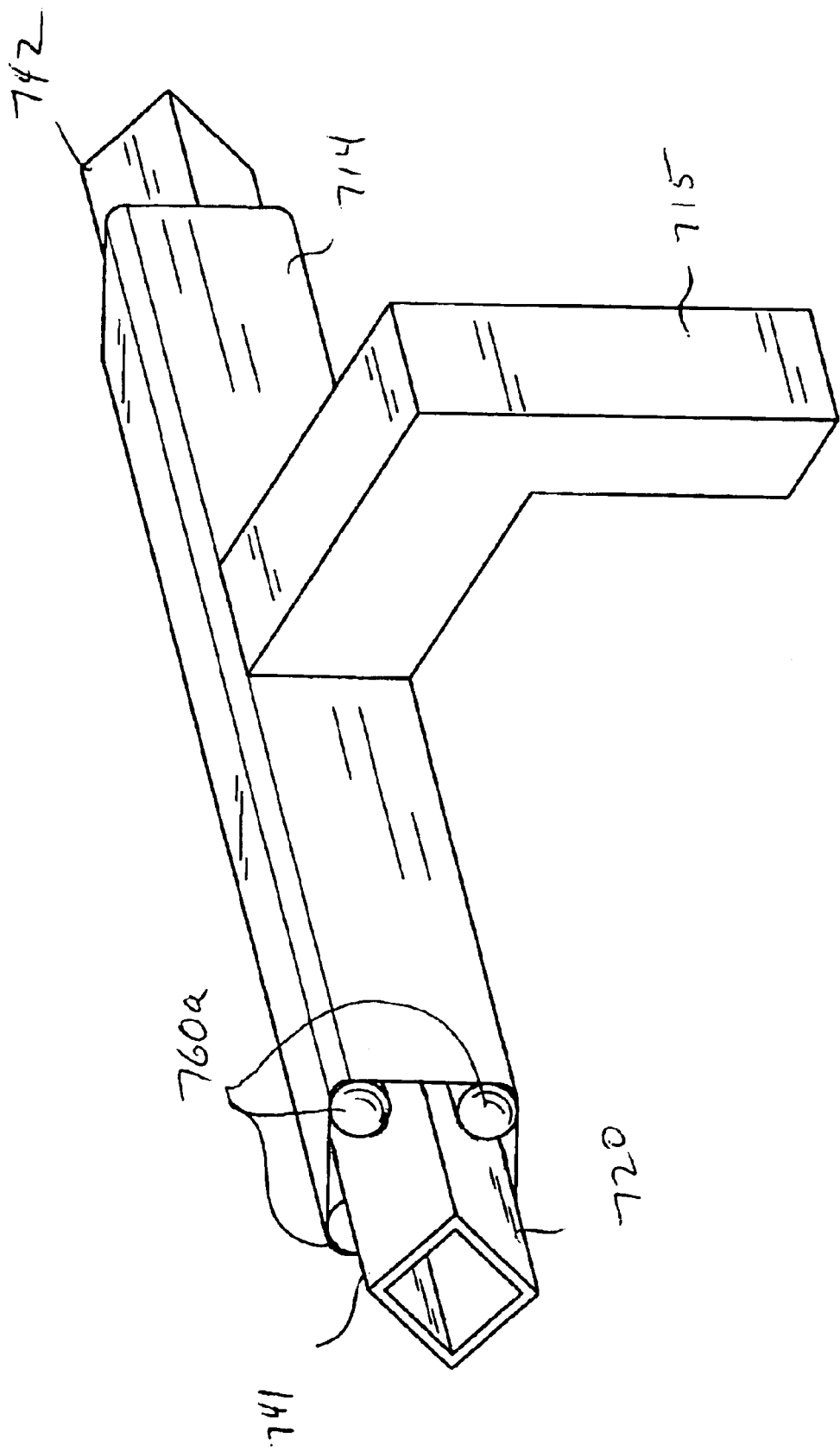
FIG. 8 is a perspective view in elevation of an alternative embodiment of the invention intended to be affixed to a trailer shown in a towing engagement with a vehicle.
Figure 9:
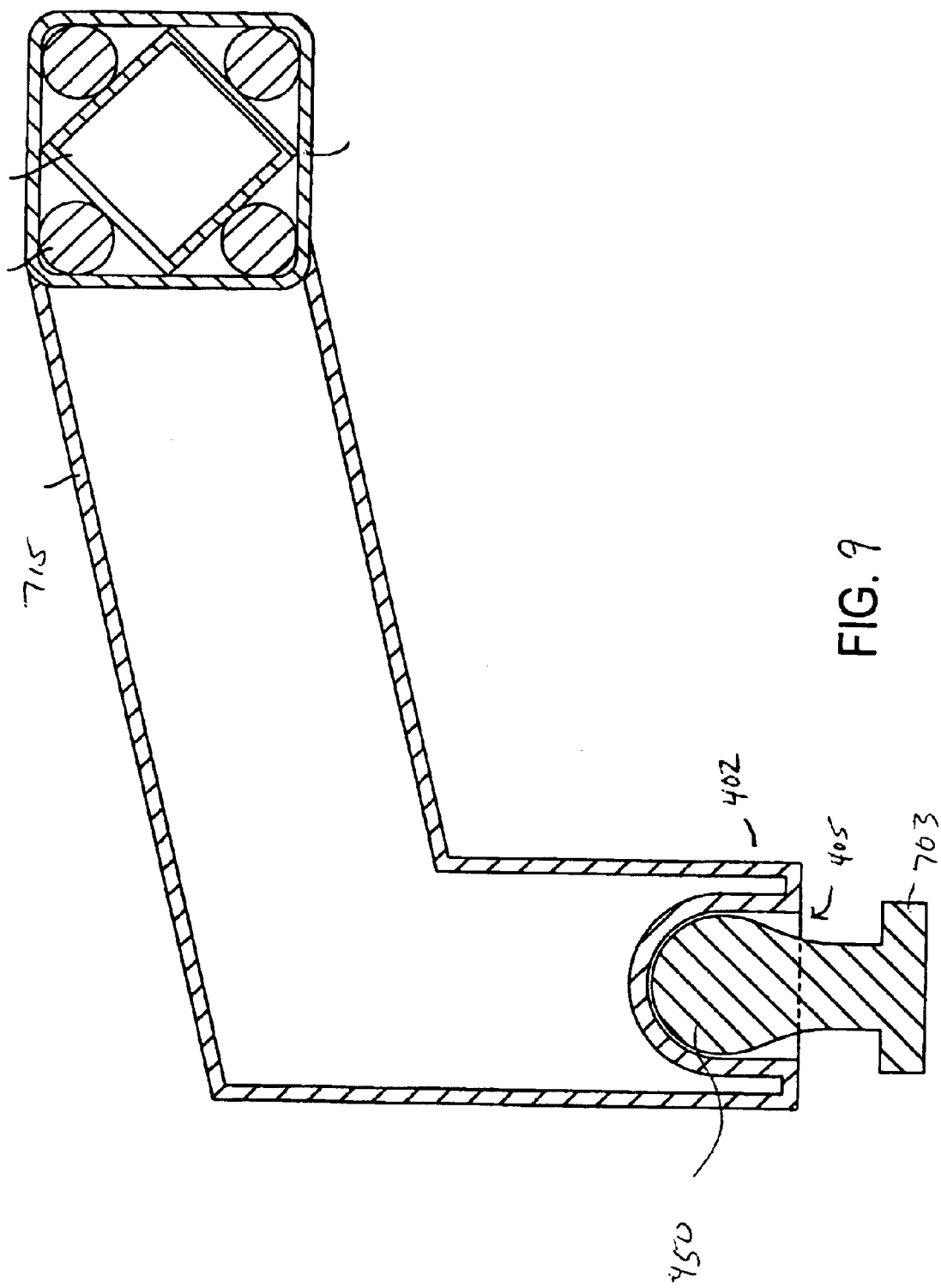
FIG. 9 is a sectional view of the embodiment of the invention that is depicted in FIG. 7. shown in engagement with a ball hitch.
Figure 10:
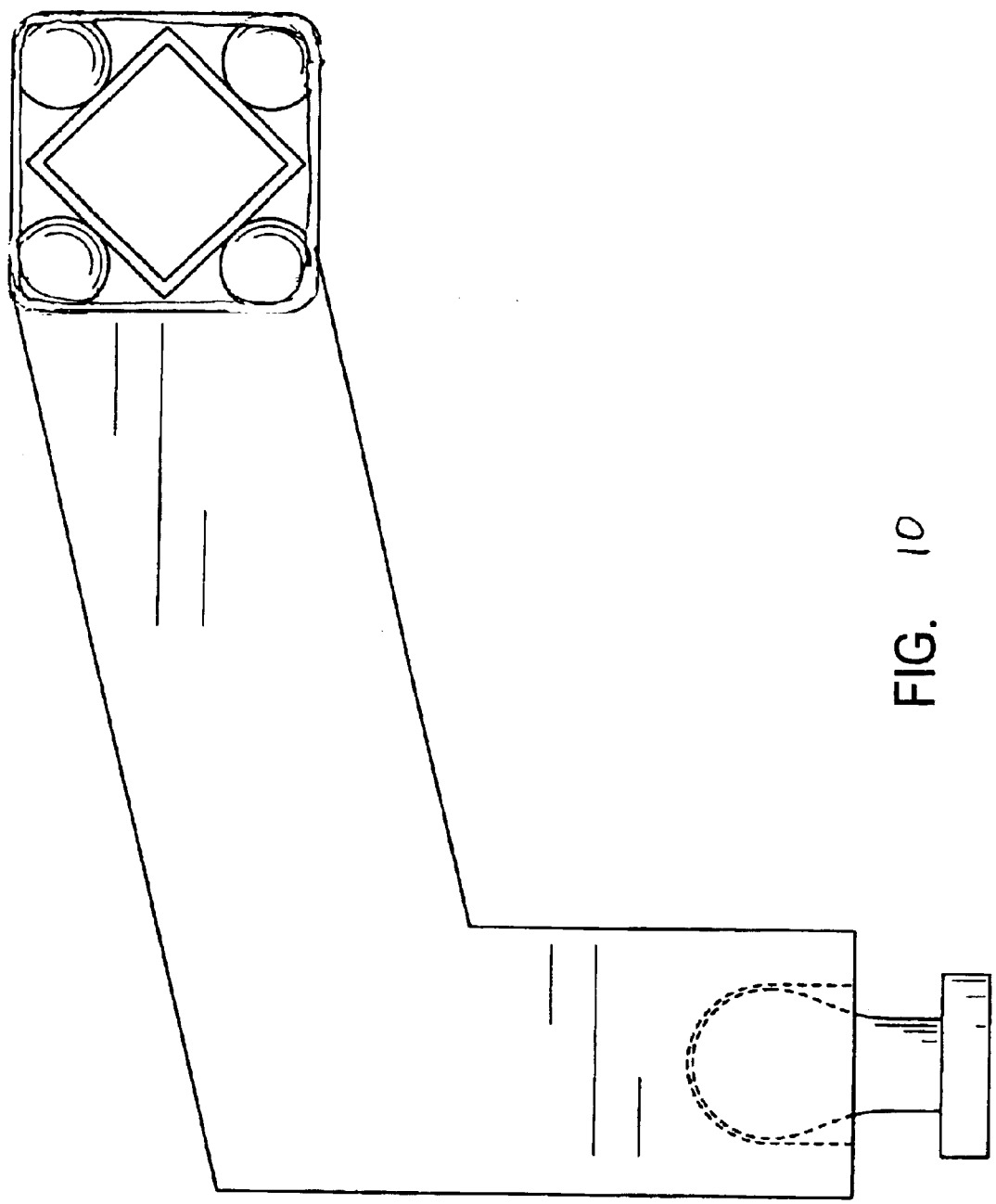
FIG. 10 is side view in elevation of the embodiment of the invention that is depicted in FIG. 7. shown in engagement with a ball hitch.

FIG. 7 depicts an alternative embodiment of the invention wherein the hitch assembly 710 is attached or integrated with a trailer assembly 701 and may be attached to a conventional hitch 703 that is attached to a towing vehicle 705. As best seen in FIG. 8 the device includes retaining member 714 from which extends a stem section 715 that is oriented downward so that it can engagement a trailer hitch. While stem section 715 is depicted as being oriented in a downward direction with respect to the torsion member 720 it is also contemplated that the stem may be in the same plane as torsion member 720 or be directed in an upward direction to engage a hitch assembly. In this embodiment torsion member 720 is suitably affixed to the trailer either by welding of another method of attachment that provides a secure affixation to the trailer at the lateral sides. This attachment arrangement may also use conventional gaskets to absorb shock that may be transmitted across the connection. As seen in FIG. 9, the dampening member includes transverse torsion member 720 and retaining member 714. As best seen in FIG. 8, the ends 741 and 742 of torsion member 720 are connected to a bracket that is provided on the front end of the trailer, like that illustrated in the previous embodiments. Torsion member 720 is separated from the receiving member 714 by a plurality of resilient cords 760. These cords run substantially along the length of torsion member 720 and separate torsion member 720 from retaining member 714. In a preferred embodiment the core member is comprised of steel and has a square axial section. In contemplated alternative embodiments the core member may have axial sections on other shapes including round, triangular, polygonal or aster shaped profiles. An aster shape profile is preferred over a round profile because the lateral grooves can receive the resilient members. In the embodiment of the invention depicted in FIG. 8 retaining member 714 has a stem 715 that receives a conventional ball hitch. Stem member 715 is be secured to the ball hitch by well-known manners. For example, a pin can be transversely inserted through the stem section 715 at a location 402 near the opening 405 that receives ball hitch member 703 thereby serving to constrict opening 405 of stem section 715. When the pin is inserted through the stem section 715 the enlarged section 450 of the ball hitch member 703 is prevented from moving out from opening 405 of stem section 715. This arrangement allows for lateral movement of trailer with respect to the towing vehicle as well as some movement in the vertical direction.

FIG. 11 depicts an alternative embodiment of a damping device that is also designed for attachment to a trailer. In this embodiment, connection member 801 and torsion member 803 are generally within a single plane. Extending from the connection member is an arm section 805 that is positioned sat a slightly higher elevation from the ground as hitch member 807. In this embodiment, integrated on the arm section 805 is a conventional tongue member 809 that is designed to engage ball hitch 807. Like the previous embodiment, the connection member 801 is separated from torsion member 803 by a plurality of resilient cords 811. As best seen in FIG. 12, torsion member 803 is attached to opposite brackets 815 and 816 which extend from the trailer 820.

Figure 13:
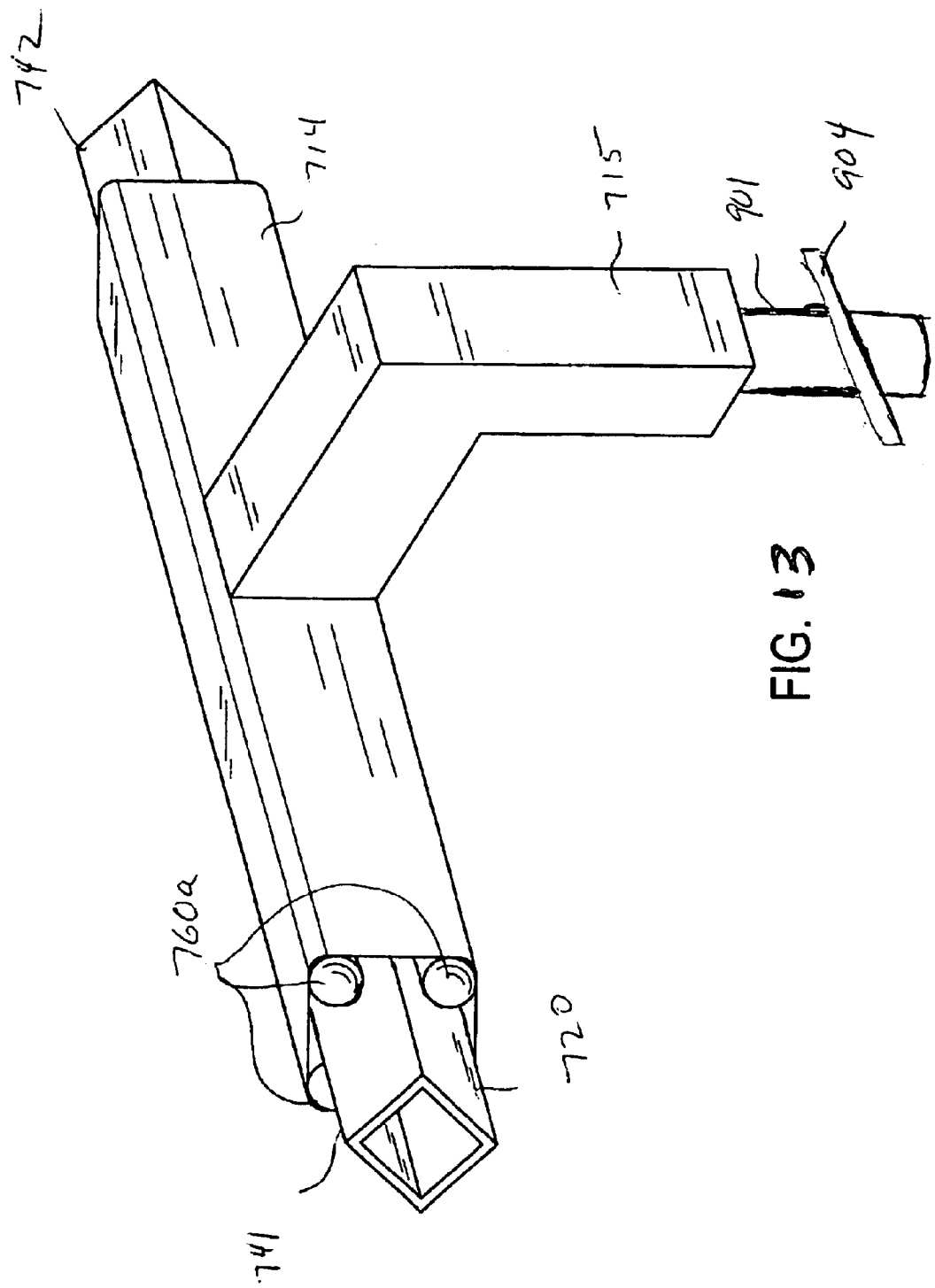
FIG. 13 is an alternative embodiment of the hitch receiving member depicted in FIG. 8 wherein the retaining member is provided with a pin for reception into a king-pin hitch assembly.

FIG. 13 depicts the hitch receiving member with pin 901 and plate 904. The pin is adapted to be received in a king-pin hitch assembly and the plate member engages a collar hitch 90 like that depicted in FIG. 3.

According to a manner in which to assemble the improved hitch assembly disclosed herein, a series of solid rubber rods are first cooled to very low temperature. For example, the rubber rods may be introduced to a vessel containing liquid nitrogen to cool the rods. Cooling the rubber causes the rubber to contract and also significantly reduces the frictional forces imposed by the rubber on surfaces. The rubber rods are then inserted into a steel pipe and then the second elongate member is inserted. As the rods warm, they expand and tightly engage the core member. In an alternative embodiment, the elongate members are first assembled and then the rubber or another elastomer is injected into any open cavities.

As apparent from the foregoing description, a trailer hitch of simple construction that significantly reduces shock and friction in a unique manner is disclosed. Because the dampening is affected along the length of the elongate member tube, the rubber or other elastomer used as the damping material will not quickly wear out, suffer from fatigue or lose its elastomeric properties. The construction of the hitch is such that the assembly may be readily mounted to vehicles which have varying frame and cargo bed sizes and configurations. The arrangement wherein a fixed member is retained with a torsion member by resilient rods provides both shock and vibrational dampening on both the vertical and longitudinal directions.

The invention having been described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A hitch receiving assembly for connecting a trailer to a vehicle adapted for towing a trailer comprising:
   a retaining member,
   a elongate fixed member oriented transverse to the direction of travel of said trailer,
   wherein said retaining member and said fixed member are concentric to one another and separated from one another by at least one resilient member, and retaining member further comprises means to receive a trailer hitch, and said elongate fixed member is attached to a trailer.

2. The hitch receiving assembly according to claim 1, wherein said elongate fixed member is inside said retaining member.

3. The hitch receiving assembly recited in claim 1 wherein said receiving means comprises a tongue adapted to receive a ball hitch.

4. A hitch assembly comprising a ball hitch and the hitch receiving assembly recited in claim 1.

5. The hitch receiving assembly recited in claim 1 wherein said means to receive a trailer hitch further comprises a pin adapted for reception in a king-pin hitch.

6. The hitch receiving assembly as recited in claim 1 wherein between said retaining member and said floating member are a plurality of resilient members.

7. The hitch receiving assembly as recited in claim 1, wherein said retaining member and said fixed member have a substantially square cross section.

8. The hitch receiving assembly as recited in claim 1 wherein said fixed member can be flexed along its length.

9. The hitch receiving assembly as recited in claim 1 wherein said fixed member is a torsion member.

* * * * *

UNITED STATES PATENT AND TRADEMARK OFFICE
CERTIFICATE OF CORRECTION

PATENT NO. : 6,957,825 B2
DATED : October 25, 2005
INVENTOR(S) : Weldon J. Peters It is certified that error appears in the above-identified patent and that said Letters Patent is hereby corrected as shown below:

Title page,
Item [75], Inventor, delete "Wledon" and insert -- Weldon --.

Signed and Sealed this

Tenth Day of January, 2006

JON W. DUDAS
*Director of the United States Patent and Trademark Office*